United States Patent [19]

Briggs

[11] Patent Number: 4,626,985
[45] Date of Patent: Dec. 2, 1986

[54] SINGLE-CHIP MICROCOMPUTER WITH INTERNAL TIME-MULTIPLEXED ADDRESS/DATA/INTERRUPT BUS

[75] Inventor: Willard S. Briggs, Carrollton, Tex.

[73] Assignee: Thomson Components - Mostek Corporation, Carrollton, Tex.

[21] Appl. No.: 783,261

[22] Filed: Oct. 3, 1985

Related U.S. Application Data

[63] Continuation of Ser. No. 454,800, Dec. 30, 1982, abandoned.

[51] Int. Cl.[4] .................... G06F 13/24; G06F 13/40
[52] U.S. Cl. .................................................. 364/200
[58] Field of Search ... 364/200 MS File, 900 MS File; 370/85, 92

[56] References Cited

U.S. PATENT DOCUMENTS

| 4,106,091 | 8/1978 | Hepworth et al. | 364/200 |
|---|---|---|---|
| 4,112,490 | 9/1978 | Pohlman et al. | 364/200 |
| 4,138,718 | 2/1979 | Toke et al. | 364/200 |
| 4,287,563 | 9/1981 | Huston, Jr. | 364/200 |
| 4,349,870 | 9/1982 | Shaw et al. | 364/200 |
| 4,361,876 | 11/1982 | Groves | 364/900 |
| 4,371,925 | 2/1983 | Carberry et al. | 364/200 |
| 4,439,839 | 3/1984 | Kneib et al. | 364/900 |
| 4,459,660 | 7/1984 | Bellay et al. | 364/200 |
| 4,479,195 | 10/1984 | Herr et al. | 364/900 |
| 4,482,953 | 11/1984 | Burke | 364/200 |
| 4,503,498 | 3/1985 | Antonov et al. | 364/200 |
| 4,523,277 | 6/1985 | Schnathorst | 364/200 |
| 4,527,266 | 7/1985 | Bogan et al. | 370/58 |

OTHER PUBLICATIONS

Motorola Inc., *Motorola Single-Chip Microcomputer Data* (DL 132 R1), Series C, 2nd printing-1984 (prev. Ed., 1981), (Description of MC 6801/MC 6803), pp. 3-52 to 3-77.

*Primary Examiner*—Archie E. Williams
*Attorney, Agent, or Firm*—Roland Plottel

[57] ABSTRACT

A microcomputer architecture permits communication between a CPU and same-chip ports and input/output circuits to be carried only over a multiplexed address-/data/interrupt bus, thereby permitting modified I/O hardware or other circuits to be included in the microcomputer without disturbing the CPU layout.

6 Claims, 7 Drawing Figures

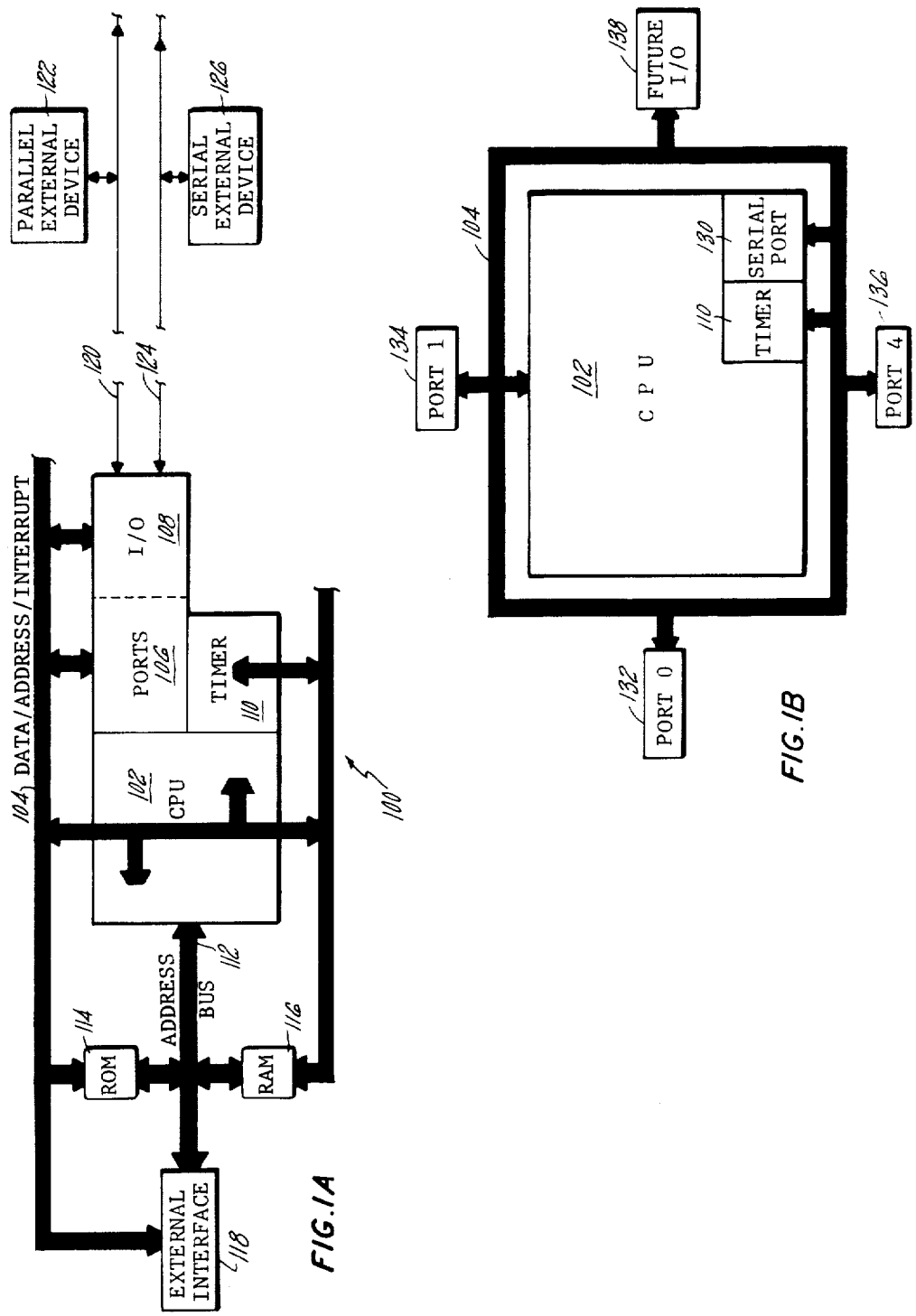

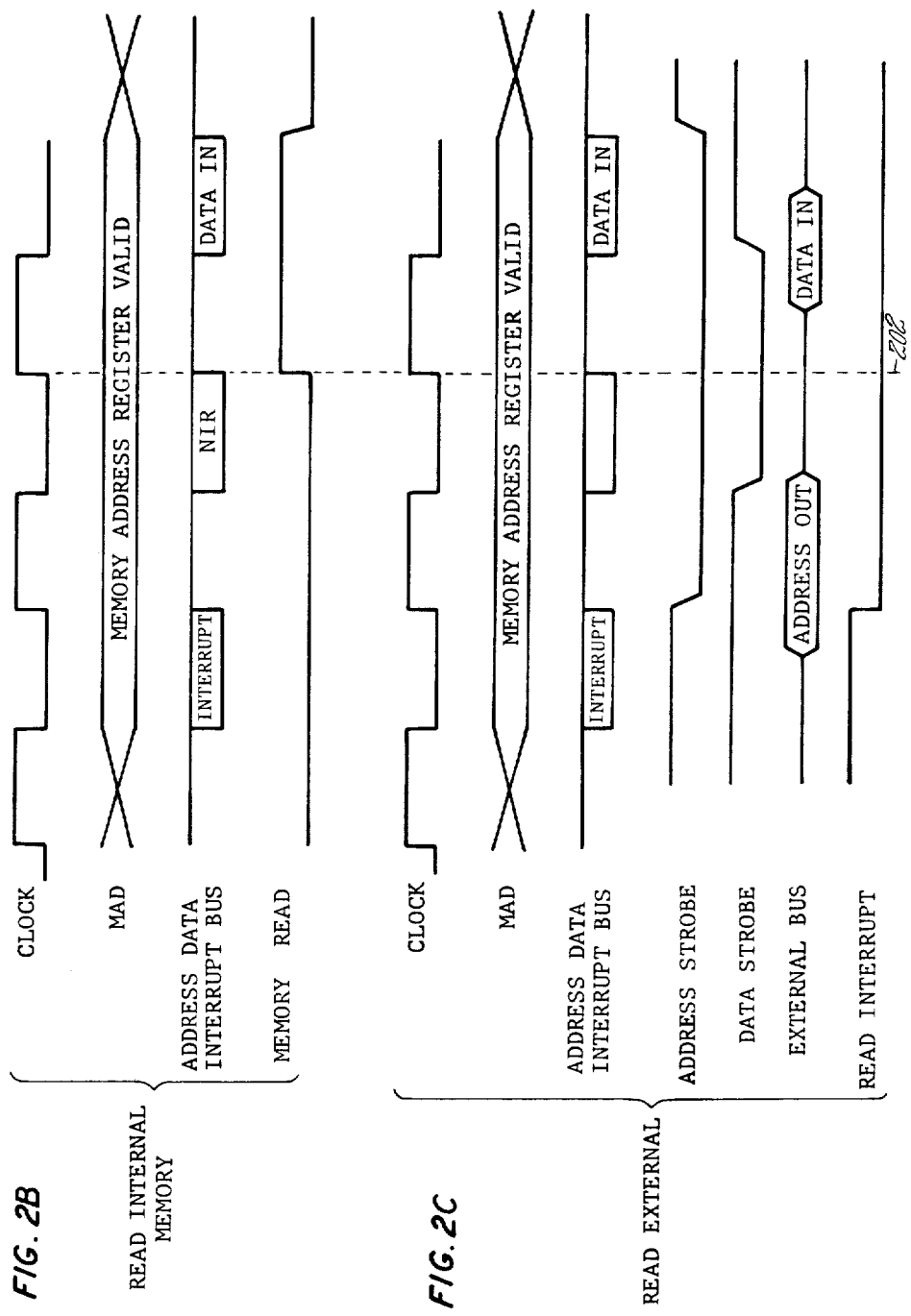

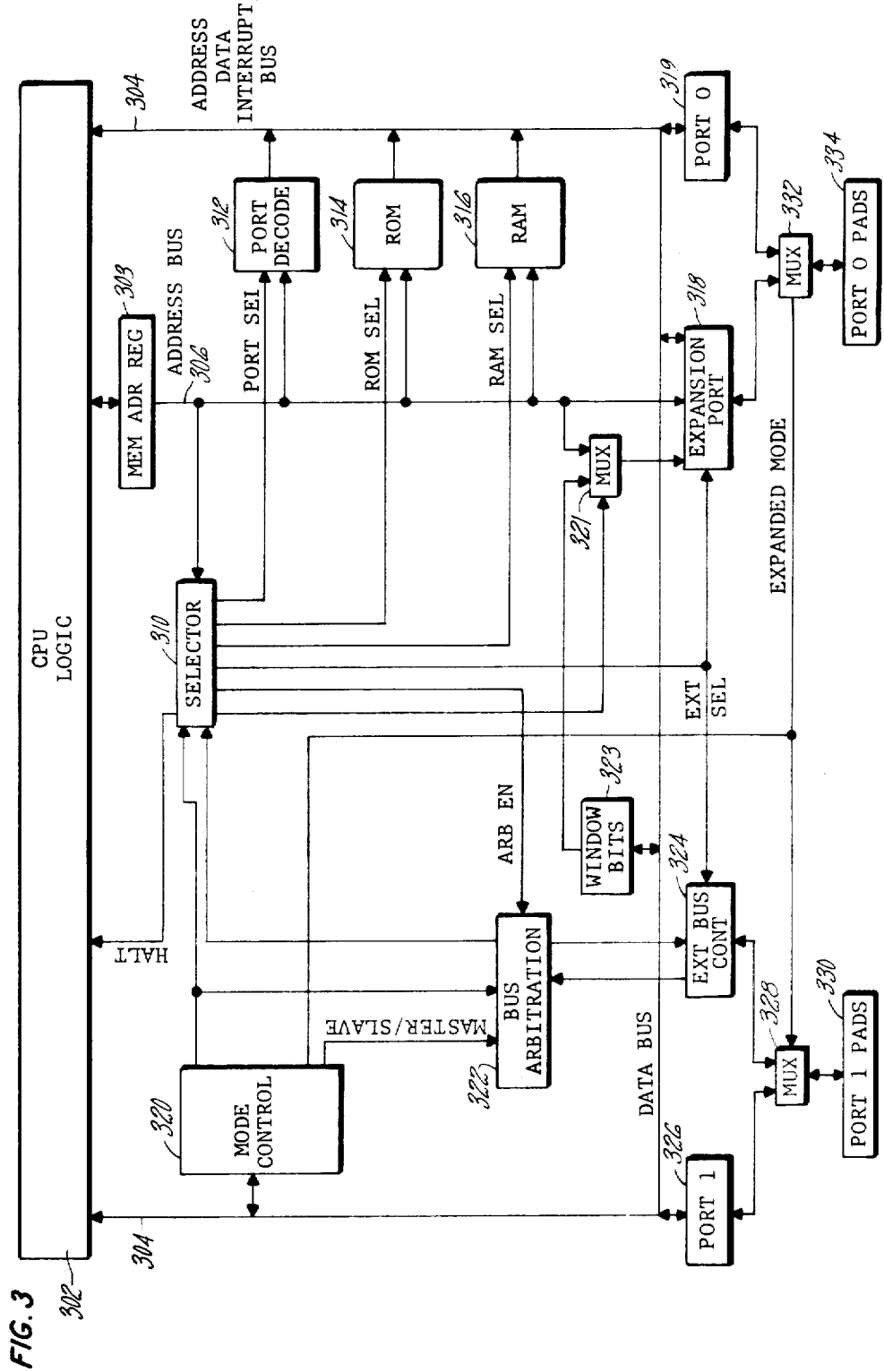

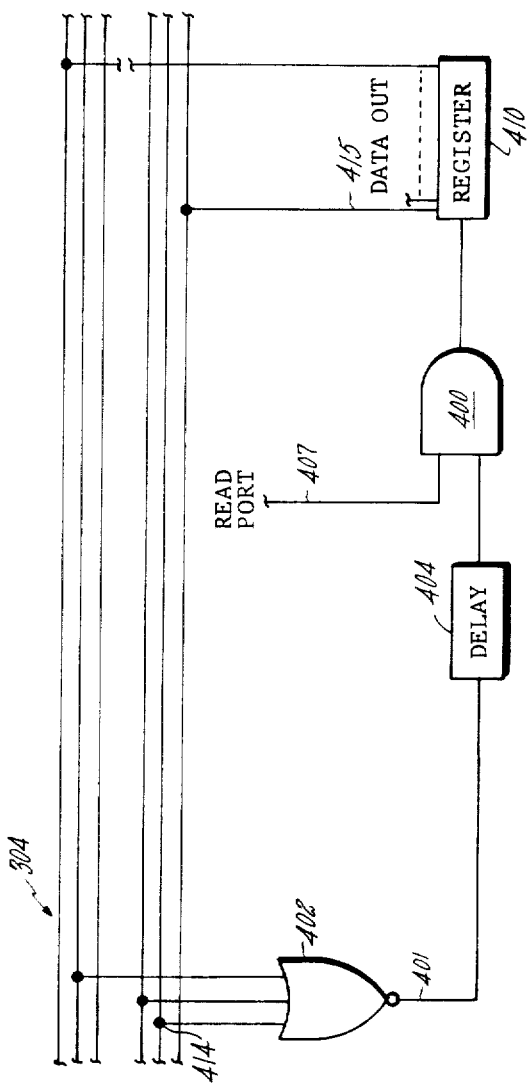

SINGLE-CHIP MICROCOMPUTER WITH INTERNAL TIME-MULTIPLEXED ADDRESS/DATA/INTERRUPT BUS

This is a continuation of application Ser. No. 454,800, filed 12/30/82, now abandoned.

CROSS REFERENCE

Copending Applications (Ser. No. 471,095), (Ser. No. 471,079) and (Ser. No. 454,799), assigned to the assignee hereof and filed simultaneously herewith are incorporated by reference.

TECHNICAL FIELD

The field of the invention is that of single chip microcomputers or of a chip which combines a central processing unit (CPU) with input/output circuits on the same chip.

BACKGROUND ART

The economics of very large-scale integrated circuits (VLSI) or microcomputers are such that it is necessary to have long production runs in order to pay for the design costs of these elaborate systems. In order to use these large-scale chips, however, it is necessary to add a number of supplementary chips to adapt the large-scale chip to the particular application in question. The cost of installing these additional less sophisticated chips can be much greater than the cost of the complex chip, and it would be economically advantageous to have a special purpose complex chip. Unfortunately, special purpose complex chips also have high design costs which usually cannot be recouped over a short production run.

The problem addressed by this invention is: integrated circuit designers would like to reuse portions of the integrated circuit masks in several of a family of similar chips. The use of "random logic" (i.e., wires placed in an irregular manner) in connecting logical blocks on a chip has made it impractical to reuse some blocks because of the high cost of redoing the layout in order to connect the different logical blocks.

Some corporations have provided families of standard cells which are connected by means of computer aided design programs which perform the laborious function of providing the random logic.

SUMMARY OF THE INVENTION

The invention relates to an integrated circuit in which communication between a CPU and same-chip ports and I.O registers or pins goes over a dedicated multiplexed bus, thereby permitting modified or supplementary I/O hardware to be attached to the bus without disturbing the CPU or other hardware on the chip.

A feature of the invention is the provision of a bus which not only multiplexes data and addresses but also multiplexes interrupt signals.

BRIEF DESCRIPTION OF DRAWINGS

FIG. 1A illustrates in partially pictorial, partially schematic form an embodiment of the invention which includes memory and external devices.

FIG. 1B illustrates in partially pictorial, partially schematic form a compact embodiment of the invention.

FIGS. 2A, 2B and 2C illustrate the timing relationships of various signals.

FIG. 3 illustrates a portion of the CPU and various bus connections.

FIG. 4 illustrates a diagram of an on-chip port constructed according to the invention.

DESCRIPTION OF THE PREFERRED EMBODIMENTS

Figure 2A:
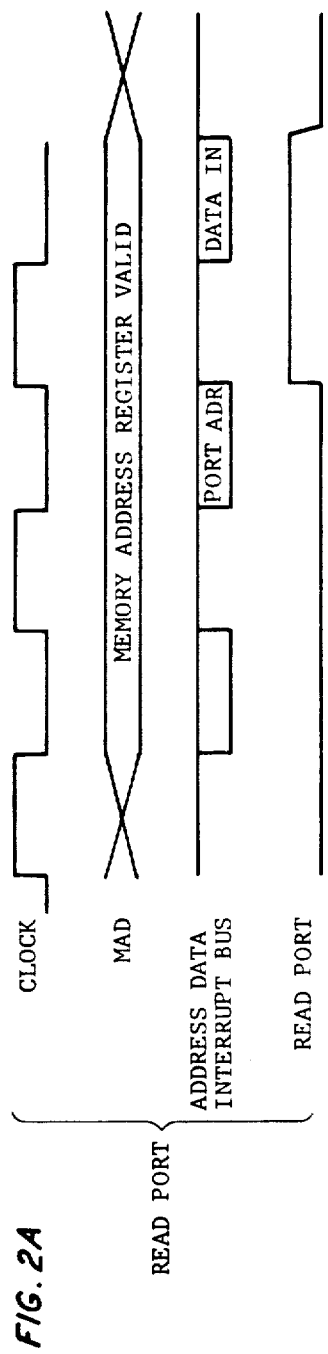

The invention relates to a family of integrated circuit devices which include a single chip microcomputer and modifications based on this microcomputer which provide alternative, more specialized forms of input/output, some of which modifications include one or more additional integrated circuits as part of a system.

The problem addressed by this family of circuits is the provision of a family of microcomputers or microprocessors which have sufficiently low design costs that small production runs to produce specialized versions of the basic circuit are economically practicable. One main item of cost saving is the ability to reuse the CPU in a number of related chips which have the same requirements of the CPU but different requirements for other specialized logic blocks. One problem with this approach is that the CPU connects with other blocks through a number of different connections and that the usual random wiring approach of placing the other logic blocks where convenient and extending wires from the CPU to them requires so much relayout work or even redesign of the CPU in order to make compatible connections with other logic blocks that it is too difficult to reuse a mask from a CPU.

One approach known in the prior art is the standard cell approach in which the connections between logical blocks of the computer are constrained to emerge at specified locations from the block and a computer design program redoes the random logic for each chip variation. The present invention greatly facilitates the redoing of the interconnections, whether done by computer or by hand, by adding and internal bus that handles all communication between the CPU and the input/output blocks that are on the chip and also transfer of data to and from on-chip memory.

The communication problems addressed by this approach are those between the CPU and the input/output devices and miscellaneous registers, generically referred to as ports. A port, as is known in the field, may be a register, a logical block such as a timer, or a set of output pins. The input/output communications not only include conventional read and write commands and data but also interrupts. In the world of microcomputers, which are conventionally used for such things as process control, cathode-ray tube control, disc drive controls and the like, the operations tend to be input/output intensive and interrupts are very important for control operations. Thus, input/output and interrupts are highly important in the efficient utilization of the computer and also in the provision of compact code which can fit into the limited on-chip memory space.

One example of a specialized microcomputer is that used in a disc controller which has essentially only one function, that of DMA between the disc and the mainframe or minicomputer for which the disc is a peripheral. A microcomputer dedicated to this application may benefit from the specialized logic blocks such as a parallel interface for DMA or a high speed serial to parallel and parallel to serial converter with a FIFO register stack as buffer.

Another particular example is that of a stand alone industrial controller such as a process controller in a chemical plant which will have many interrupts—external interrupts responding to measuring devices and internal interrupts from timers so that the computer may respond in a real time manner.

The subject invention was made in the course of developing a family of microcomputers for Mostek Corporation of Carrollton, Texas, and further information may be found in the publication MK68200, "Principles of Operation", Version 2.1, dated July 1982 and available from Mostek Corporation, 1215 West Crosby Rd.; Carrollton, Tex. 75006, which manual is incorporated by reference.

The bus used in the illustrative embodiment of the invention contains 16 multiplexed data lines plus 3 control lines, read, write and interrupt, plus 2 clock lines, a reset line, a 5 volt power supply line and a ground line.

This internal bus, or internal block bus, extends from the CPU around the chip; either around the outside of the chip or threading through the main logical blocks, whichever is more convenient. The use of such a bus gives great flexibility in positioning logical blocks or logical subcircuits so it is no longer necessary to exercise a great deal of design time in order to devise a solution which will fit blocks in close proximity to the CPU so that the random logic wiring may be effectively accomplished.

A 6 bit logical block address uses lines 1-6 of the bus. Two additional lines are used to indicate whether the upper byte, lower byte or both bytes of the 16 bit word being transferred is to be used. It is not necessary that the logical block address be any particular number of bits, and anything up to the full memory address could be used.

In the particular family of microcomputers which form the basis for the illustrative embodiment of the subject invention, up to 20 ports are used, not only for external input/output but also for communication between circuits on the chip. A port may be a register, a buffer or a set of pins.

FIG. 1A illustrates in partially pictorial, partially schematic form the layout of a microcomputer constructed according to the subject invention. In it, CPU 102 is penetrated by a multiplexed data/address/interrupt bus 104 which extends to a set of ports 106, a set of specialized input/output devices 108, to one or more timers 110, to ROM 114, to RAM 116 and to external interface 118. The area accessed by bus 104 is indicated generally by 100 in the diagram. A separate 16 bit memory address bus 112 extends from the CPU to ROM 114, to RAM 116 and to external interface 118. Memory address bus 112 is kept separate from logic block bus 104 in order to get the address to memory as quickly as possible, so that the decoding operation in memory will have time to work through before the data is needed. External interface 118 passes off-chip memory addresses from bus 112 to external memory that is mapped in memory space and places returning data on bus 104. It would be possible to send the memory address along bus 104 if timing consideration are not an obstacle in the particular system that is being constructed. For purposes of illustration, communication between I/O circuits 108 handling general input/output functions and external devices is also shown. Parallel bus 120, a 16 bit external bus, extends from pins connected to I/O circuits 108 to a parallel external device 122, such as an external memory or another computer. Similarly, serial line 124 extends to serial external device 126, such as a modem for telecommunications.

Another embodiment of the subject invention having a closer spatial relationship to the family of circuits which have been used are shown in FIG. 1B in partially pictorial, partially schematic form. There CPU 102, timers 110 and serial port 130 are combined in a single large block which is surrounded by bus 104. Bus 104 in turn communicates with ports 132, 134 and 136. These ports are shown on the outside of the figure in order to emphasize that they are conventiently placed in relationship to the external pins which communicate with other circuits. Another device 138, indicated schematically as future I/O, is also in communication with the bus, showing pictorially that the bus is conveniently adapted to expanding additional logical blocks in unused areas of the chip. Such an arrangement facilitates expanding the chip size merely by reusing the mask which is bounded by bus 104 and adding a separate mask to take care of the additional devices.

It should be noted that the block referred to as the CPU in this application need not be a device which incorporates all of the logical functions that are commonly referred to in the computer field as the CPU. It may be convenient to break up the CPU into subdevices which are in communication through the bus. One particular example may be that of a specialized DMA block, which would be convenient for applications such as a disc controller involving a great deal of data transfer.

The timing relationship for some selected operations are shown in FIG. 2, showing the status of selected control lines and the contents of the memory address register (MAD). In FIG. 2B, which illustrates a data fetch from internal memory, the microcode routine boundary between the Nth and (N+1)th instruction is indicated by dotted line 202. Two clock cycles before time 202, interrupt signals, if any, pass over bus 104, at a time when the read interrupt signal is high. During the entire period of the Nth instruction, the address in memory space of the port from which data is to be fetched is in the memory address register. During the last clock cycle of the Nth instruction, bus 104 carries the contents of the next instruction register, for a purpose that is not relevant to the present invention. Data is placed on the bus in the first clock cycle of the (N+1)th instruction, at which time a read out control line that is part of bus 104 is high.

FIG. 2A shows a similar sequence for a read operation from a port. In this sequence, the time slot that was available for interrupts in the fetch sequence of FIG. 2B is not used, since interrupts are passed only during the fetch sequence at the end of an instruction. A 6 bit port address, formed from bits 1-7 of the 16 bit port address in memory space is placed on the bus during the last clock cycle of the Nth instruction. Data from the port is placed on the bus during the first clock cycle of the (N+1)th instruction.

A simplified diagram of a port is shown in FIG. 4, in which bus 304, the multiplexed address/data/interrupt bus, is connected to wires 414 that connect to those lines of bus 304 that are low in the port address for that port. Line 414 are inputs to NOR gate 402 that functions as the address reception circuit. The output of circuit 402 is delayed in delay circuit 404 until the next clock cycle. On the next clock cycle, the read port control line of bus 304, shown as line 407, is combined with the delayed address received signal in AND gate 400 to form a signal that unloads the contents of register 410 onto bus 304 through lines 415. Similar circuitry will load register 410. Different ports may have additional conventional circuitry to perform special functions (multiplexing connections to pads, and the like). Such additional circuits are omitted from the drawing for simplicity, since those skilled in the art will readily be able to generate suitable circuits.

Another timing sequence is shown in FIG. 2C for a read external sequence. Here, the (external) memory address is sent out on an external bus during the Nth instruction. An address strobe signal (active low) informs the external memory that there is a valid address on the external bus. The (external) memory address passes through the particular port that is connected to the external bus by means of a data path that will be described below and without waiting for the port address to be placed on bus 104 (there is a hardware connection from memory address bus 112 to the port that is connected to the external bus). Data is placed on the external bus in response to the data strobe signal and is passed through the designated port and placed on bus 104 at the end of the data strobe signal. The direct connection for the address transfer is used to improve the cycle speed to compensate for the time it takes for a memory address to work its way through decoding logic in the memory unit.

A convenient additional feature of this family of microcomputers is illustrated in paragraph 4.9 of the manual which lists 15 instructions which may be used with a short form address to perform operations and moves to and from the ports. These short form instructions save one word of ROM for each port reference. Since microcomputer applications are I/O intensive, this contributes materially to providing compact coding. When such a short form port instruction is decoded within the CPU, the port address in memory space is formed by adding standard bits to a 4 bit port number that is part of the instruction. The memory address register is filled with this port address in memory space and port decoder 312 generates a port address in the same manner as if a long-form instruction has been used.

FIG. 3, taken from copending application Ser. No. 471,095, shows in more detail the relationship of the buses. Memory address bus 112 is shown as bus 306 and address/data/interrupt bus 104 is shown as bus 304 in this figure. Bus 306 follows the contents of memory address register 303. Selector 310 responds to addresses in selected ranges, since the I/O is memory mapped, to send enabling signals to expansion port 318 to pass an external memory address directly to pads 334. Selector 310 also enables on-chip ROM 314 or on-chip RAM 316 to respond to an on-chip memory address carried on bus 306. The contents of the memory address (whether on-chip or off-chip) being fetched are placed on bus 304 and passed to the remainder of the CPU, shown as 302 in the figure. In the case of a port read or write, selector 310 detects an address in the range reserved for ports and enables port decoder 312, which generates the port address and places it on bus 304. When an address range is in the 16K DMA window reserved for external memory, expansion port 318 is enabled by selector 310 (at a time when the external bus is available) and passes the address from address bus 306 thorugh multiplexer 332, which is enabled by mode control unit 320. Mode control 320 responds to signals described in copending application Ser. No. 471,079 that inform it that there is external memory in the system. Ports 318 and 319 and multiplexer 332 are shown as separate logical blocks in FIG. 3. In an actual embodiment, separate portions of each of these units will control each of the 16 paths extending to the external pads 334. Many different hardware configurations that will accomplish these functions will be evident to those skilled in the art.

The third major type of data which goes across bus 304 is that of interrupts. The MK68200 series of microcomputers can have up to 15 different interrupts which can be programmed and reprogrammed by the user. There are provisions for three external interrupt pins, four interrupts from two internal timers and a number of other interrupts. The CPU is sensitive to an interrupt request on every instruction cycle at a time two clock cycles before the end of the instruction. The priority of separate interrupts is fixed within the CPU, but the user can program port 8 in order to suppress any desired number of interrupts, thereby altering the priority as he chooses. If a port has an interrupt to send to the CPU, it pulls a particular line on the multiplexed address/data/interrupt bus low the next time that the read interrupt line (one of the control lines on the multiplexed bus) goes low. Port 7, located within the CPU block, is a latch register that sets a bit corresponding to the line or lines that are carrying interrupt signals. Those interrupts that are enabled by a user-programmable bit in a corresponding enable register are sent to priority hardware. If two or more interrupts are passed simultaneously, then one is selected according to a built-in priority table. The user's control of the process is that he can mask out any interrupt source except the reset pin and a special non-maskable interrupt and thus alter the priority structure. By modifying port 8 during an interrupt service routine, the programmer can nest several interrupt levels, with different interrupts being permitted on any level.

In contrast, prior art microcomputers are restricted in their interrupt handling. A popular method has been to allot the priority decision to an external chip—an approach that is limited in flexibility.

What is claimed is:

1. A single-chip microcomputer having on-chip memory and a number of logical units on an integrated circuit chip, including:
    a first processing unit;
    at least one on-chip input/output unit;
    at least one port register unit external to said first processing unit;
    at least one memory unit;
    means for passing interrupt flag signals from at least one interrupt source to said first processing unit; and
    means for passing signals to and from said logical units and said processing unit along at least one time-multiplexed internal address/data bus;
    in which microcomputer said input/output unit, port register unit and memory unit are all mapped in a memory space, each having at least one memory address in said memory space;
    characterized in that:
    said means for passing signals includes means for time-multiplexing, within an instruction cycle, said internal address/data bus between an interrupt-sensing period and at least one other period, whereby said internal address/data bus becomes an address/data/interrupt bus;
    said first processing unit includes means for sensing interrupt flag signals indicating the presence of interrupt on said internal address/data bus during said interrupt-sensing period; and said internal address/data bus is the only signal path for address data, non-address data and interrupt flag signals between said first processing unit and any of said at least one on-chip input/output unit and said at least one port register.

2. A microcomputer according to claim 1, further characterized in that said first processing unit transmits memory addresses to said on-chip memory unit on a memory bus separate from said multiplexed address/data/interrupt bus and in which non-address data passes between said on-chip memory unit and said first processing unit on said time-multiplexed internal address/data/interrupt bus.

3. A microcomputer having on-chip memory and a number of logical units on an integrated circuit chip, including:
   a first processing unit;
   at least one on-chip input/output unit;
   at least one port register unit external to said first processing unit;
   at least one memory unit;
   means for passing interrupt flag signals from at least one interrupt source to said first processing unit; and
   means for passing signals to and from said logical units and said processing unit along at least one time-multiplexed internal address/data bus;
   in which microcomputer said input/output unit, port register unit and memory unit are all mapped in a memory space, each having at least one memory address in said memory space;
   characterized in that:
   said means for passing signals includes means for time-multiplexing, within an instruction cycle, said internal address/data bus between an interrupt-sensing period and at least one other period, whereby said internal address/data bus becomes an address/data/interrupt bus;
   said first processing unit includes means for sensing interrupt flag signals indicating the presence of an interrupt on said internal address/data bus during said interrupt-sensing period, whereby said internal address/data bus becomes an address/data/interrupt bus;
   said internal address/data bus is the only signal path for address data, non-address data and interrupt flag signals between said first processing unit and any of said at least one on-chip input/output unit and said at least one port register; and
   at least two interrupt sources each have a reserved line on said internal bus, whereby at least two interrupt flag signals may pass simultaneously from said at least two interrupt sources into said first processing unit.

4. A microcomputer according to claim 3, further characterized in that said at least two interrupt flag signals pass into programmable priority means in said first processing unit, whereby the response of said first processing unit to an interrupt may be altered during real time by a program in said microcomputer.

5. A microcomputer according to claim 3, further characterized in that said first processing unit transmits memory addresses to said on-chip memory unit on a memory bus separate from said multiplexed address/data/interrupt bus and in which non-address data passes between said on-chip memory unit and said first processing unit on said time multiplexed internal address/data/interrupt bus.

6. A microcomputer according to claim 3, further characterized in that said reserved lines are time-multiplexed lines in said time-multiplexed bus.

* * * * *